US010048289B2

(12) United States Patent
Lal et al.

(10) Patent No.: US 10,048,289 B2
(45) Date of Patent: Aug. 14, 2018

(54) MOTION SENSOR INTEGRATED NANO-PROBE N/MEMS APPARATUS, METHOD, AND APPLICATIONS

(71) Applicant: CORNELL UNIVERSITY, Ithaca, NY (US)

(72) Inventors: Amit Lal, Ithaca, NY (US); Kwame Amponsah, Ithaca, NY (US)

(73) Assignee: Cornell University, Ithaca, NY (US)

( * ) Notice: Subject to any disclaimer, the term of this patent is extended or adjusted under 35 U.S.C. 154(b) by 39 days.

(21) Appl. No.: 14/364,745

(22) PCT Filed: Dec. 17, 2012

(86) PCT No.: PCT/US2012/070048
§ 371 (c)(1),
(2) Date: Jun. 12, 2014

(87) PCT Pub. No.: WO2013/090887
PCT Pub. Date: Jun. 20, 2013

(65) Prior Publication Data
US 2014/0331367 A1 Nov. 6, 2014

Related U.S. Application Data

(60) Provisional application No. 61/576,455, filed on Dec. 16, 2011.

(51) Int. Cl.
*G01Q 70/08* (2010.01)
*G01Q 70/06* (2010.01)
(Continued)

(52) U.S. Cl.
CPC ............. *G01Q 20/00* (2013.01); *G01Q 10/00* (2013.01); *G01Q 60/30* (2013.01); *G01Q 70/06* (2013.01); *G01Q 70/08* (2013.01)

(58) Field of Classification Search
None
See application file for complete search history.

(56) References Cited

U.S. PATENT DOCUMENTS 3,572,724 A * 3/1971 Rabinow ............ G11B 3/08587
369/220
5,410,151 A * 4/1995 Buckland ............... B82Y 20/00
250/227.11

(Continued)

OTHER PUBLICATIONS

Amponsah et al., Monolithically Integrated Juction FETS and NEMS, 2011 IEEE 24th International Conference on Mems, Jan. 27, 2011, pp. 91-94.

*Primary Examiner* — Wyatt Stoffa
*Assistant Examiner* — James Choi
(74) *Attorney, Agent, or Firm* — Bond, Schoeneck & King, PLLC; William Greener; Blaine Bettinger

(57) ABSTRACT

A multi-tip nano-probe apparatus and a method for probing a sample while using the multi-tip nano-probe apparatus each employ located over a substrate: (1) an immovable probe tip with respect to the substrate; (2) a movable probe tip with respect to the substrate; and (3) a motion sensor that is coupled with the movable probe tip. The multi-tip nano-probe apparatus and related method provide for improved sample probing due to close coupling of the motion sensor with the movable probe tip, and also retractability of the movable probe tip with respect to the immovable probe tip.

21 Claims, 22 Drawing Sheets

(51) Int. Cl.
  *G01Q 10/00*  (2010.01)
  *G01Q 20/00*  (2010.01)
  *G01Q 60/30*  (2010.01)

(56) References Cited

U.S. PATENT DOCUMENTS

| | | | |
|---|---|---|---|
| 5,959,200 A * | 9/1999 | Chui | B82Y 35/00 73/105 |
| 6,073,484 A | 6/2000 | Miller et al. | |
| 6,448,553 B1 * | 9/2002 | Itsuji | B82Y 35/00 250/307 |
| 2002/0005728 A1 * | 1/2002 | Babson | G01R 1/06744 324/755.05 |
| 2007/0089497 A1 * | 4/2007 | Reinstadtler | B82Y 35/00 73/105 |
| 2010/0132441 A1 * | 6/2010 | Oh | G01N 3/42 73/82 |
| 2010/0257644 A1 * | 10/2010 | Turner | B82Y 35/00 850/8 |
| 2011/0260810 A1 * | 10/2011 | Quevy | H03H 3/0072 333/200 |

* cited by examiner

MOTION SENSOR INTEGRATED NANO-PROBE N/MEMS APPARATUS, METHOD, AND APPLICATIONS

CROSS-REFERENCE TO RELATED APPLICATION

This application is related to, and derives priority from, U.S. Provisional Patent Application Ser. No. 61/576,455, filed 16 Dec. 2011 and titled Nano Probe Actuator, the content of which is incorporated herein fully by reference.

STATEMENT OF GOVERNMENT INTEREST

The research that lead to the embodiments as described herein, and the invention as claimed herein, was funded by the United States National Science Foundation under cooperative agreement DMR 1120296. The United States Government has rights in the invention as claimed herein.

BACKGROUND

Field of the Invention

Embodiments relate generally to nano-scale microelectromechanical system (N/MEMS) apparatus and related methods. More particularly, embodiments relate to motion actuation and sensor integrated nano-scale microelectromechanical system apparatus and related methods.

Description of the Related Art

Nano-probe tip-based nano-fabrication processes often require precision placement of a plurality of nano-probe tips. As well, nano-probe tip-based nano-measurement apparatus may also sense a contacted physical surface through atomic force microscopy (AFM) sensing methodology or scanning tunneling microscopy (STM) sensing methodology. Since nano-fabrication process applications and nano-measurement apparatus are likely to continue to increase, desirable are additional nano-probe tip-based apparatus, related methods and related applications.

SUMMARY

Embodiments include a multiple-tip nano-probe apparatus for probe tip-based sensing with integrated JFETs (junction field effect transistors) as preamplifiers. As capacitive transducers are scaled to nanoscale dimensions, their impedance ($1/j\omega C$) is greatly increased, making them susceptible to parasitic capacitance, RF noise and charge coupling from local static and RF fields. Previous efforts to integrate scanning systems have had lower performance due to noise coupling, as the wiring needed to connect to off-chip electronics added significant RF coupling noise.

The embodiments thus provide a multi-tip nano-probe apparatus with JFETs tightly integrated within the nano-probe apparatus to realize local signal measurements, including differential measurements. The JFET device is monolithically integrated into the N/MEMS apparatus to reduce the effect of parasitic circuit elements, signals and mismatches. The JFETs also provide on-chip gain and impedance transformation for low noise operation. JFETs are ideal candidates for N/MEMS signal transduction due to their low 1/f noise, high gain, low-mask count for fabrication, absence of parasitic diodes and insensitivity to electrostatic discharge.

Within the embodiments, a nano-probe tip whose position is freely movable with respect to a substrate (i.e., the nano-probe tip is not attached to the substrate) is coupled to JFET electrodes through electrostatic energy sustaining gaps, and can be sensed by the JFET in two ways. First, the electrostatic force on the JFET induces a strain in the channel which tends to modify the channel carrier mobility of the JFET. Second, the coupled charges across the probe beam of a nano-probe apparatus generate a floating potential on one of the gates of a JFET, which modulates the transistor channel current as a signal that can be measured.

Within the embodiments the freely movable nano-probe tip position is also coupled to JFET electrodes through a meander spring so that a JFET and a meander spring together may be regarded as a motion sensor with respect to a freely movable nano-probe tip position and movement.

As indicated above, within the embodiments, a "freely movable" probe tip is intended as a probe tip that is not attached to a substrate.

Within the embodiments and within the claims, use of the terminology "over" with respect to two layers or two structures over a substrate is intended to indicate an overlapping spatial and areal disposition of the two layers or the two structures, but not necessarily contact of the two layers or two structures. In contrast, use of the terminology "upon" with respect to two layers or two structures over the substrate is intended to indicate an overlying spatial and areal disposition of the two layers or two structures, with contact of the two layers or two structures.

Within the embodiments and within the claims, desirably all layers and structures are located and formed over a single substrate.

Within the embodiments and within the claims, use of the terminology "coupled" or "operatively coupled" with respect to components of a motion sensor, or coupling of a movable probe tip with respect to the motion sensor, is intended as an electrical, mechanical, electromechanical or other type connection in a fashion that provides a desirable and operational signal result.

Within the embodiments and within the claims, use of the terminology "pressure sensitive component" with respect to a motion sensor is also intended to include force sensitive components within the context of unit area, whose operation thus derives in general from operation of pressure sensitivity.

Within the embodiments and within the claims, "pointed in the same direction" with respect to at least one movable probe tip and at least one immovable probe tip is intended to indicate nominally the same direction taking into consideration a deflection of any of a group of immovable probe tips and movable probe tips with respect to each other.

A particular nano-probe apparatus in accordance with the embodiments includes a substrate. This particular nano-probe apparatus also includes at least one movable probe tip located over the substrate. The at least one movable probe tip is movable with respect to the substrate. This particular nano-probe apparatus also includes at least one motion sensor located over the substrate. The at least one motion sensor comprises at least one pressure sensitive component operatively coupled with at least one spring. The at least one motion sensor is operatively coupled with the at least one movable probe tip.

Another particular nano-probe apparatus in accordance with the embodiments includes a substrate. This other particular nano-probe apparatus also includes at least one immovable probe tip located over the substrate. The at least one immovable probe tip is immovable with respect to the substrate. This other nano-probe apparatus also includes at least one movable probe tip located over the substrate. The at least one movable probe tip is movable with respect to the substrate.

Yet another particular nano-probe apparatus in accordance with the embodiments includes a substrate. This other particular nano-probe apparatus also includes at least one immovable probe tip located over the substrate. The at least one immovable probe tip is immovable with respect to the substrate. This other particular nano-probe apparatus also includes at least one movable probe tip located over the substrate. The at least one movable probe tip is movable with respect to the substrate and with respect to the immovable probe tip. This other particular nano-probe apparatus also includes at least one motion sensor located over the substrate and coupled with the at least one movable probe tip.

A particular probing method in accordance with the embodiments includes positioning with respect to a sample at least one movable probe tip within a probe apparatus comprising: (1) a substrate; (2) at least one movable probe tip located over the substrate, the at least one movable probe tip being movable with respect to the substrate; and (3) at least one motion sensor located over the substrate, the at least one motion sensor comprising at least one pressure sensitive component and at least one spring, the at least one motion sensor being operatively coupled with the at least one movable probe tip. This particular probing method also includes moving the at least one movable probe tip with respect to the sample while measuring a signal output at the at least one motion sensor.

Another particular probing method in accordance with the embodiments includes positioning with respect to a sample at least one movable probe tip within a probe apparatus comprising: (1) a substrate; (2) at least one immovable probe tip located over the substrate, the at least one immovable probe tip being immovable with respect to the substrate; (3) at least one movable probe tip located over the substrate, the at least one movable probe tip being movable with respect to the substrate; and (4) at least one motion sensor located over the substrate and operatively coupled with the at least one movable probe tip. This other particular method also includes moving the at least one movable probe tip with respect to the sample while measuring a signal output at the at least one motion sensor.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein:

FIG. 3 also shows a doping profile for the JFET.

FIG. 24A shows a SOI substrate that was used to fabricate the nano-probe apparatus in accordance with the embodiments. The surface silicon device layer was 2 um thick and the buried oxide layer ranged from 1-2 um thick. As is illustrated within schematic perspective-view diagrams that follow, a base semiconductor substrate upon which is formed the buried oxide layer comprises a support for other components within a probe apparatus in accordance with the embodiments.

FIG. 24E shows the Cr was removed and the $SiO_2$ served as a diffusion mask. PH-1025 solid source target was used to diffuse phosphorus dopants into the source and drain terminals and annealed to drive the dopants further in.

FIG. 24T shows the device was released in vapor HF.

DETAILED DESCRIPTION OF THE EMBODIMENTS

Figure 1:
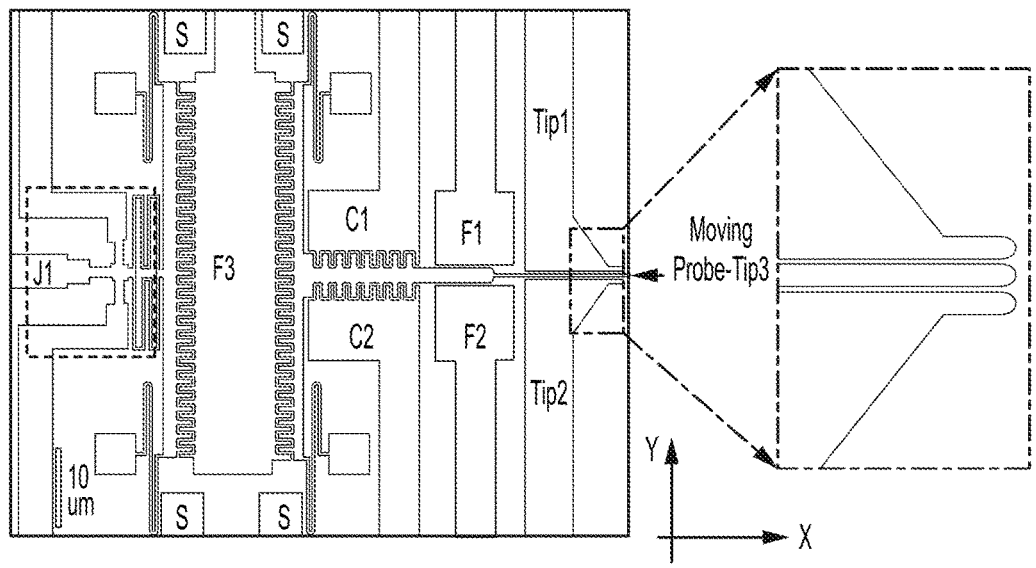
FIG. 1 shows a plan-view diagram of a multi-tip nano-probe apparatus in accordance with the embodiments with probe, JFET, meander and stoppers (S). The stoppers restrict motion of the exterior comb portions of the actuator F3.

Embodiments provide a multi-tip nano-probe apparatus, along with methods for operating the foregoing multi-tip nano-probe apparatus. The multi-tip nano-probe apparatus and related methods provide improved performance insofar as a motion sensor is tightly coupled with respect to a movable probe tip within the multi-tip nano-probe apparatus. In addition, the multi-tip nano-probe apparatus and related methods provide improved performance and improved capabilities insofar as a movable probe tip is operational with respect to an immovable probe tip within the multi-tip nano-probe apparatus. The movable tip and immovable tip can be brought together to nanometer scale dimensions, which is important to measure properties at nanoscale spatial distances.

1. General Considerations

A multi-tip nano-probe apparatus in accordance with the embodiments includes a substrate (i.e., preferably a single substrate) which in a first instance includes at least one (and preferably at least two, or more than two) immovable probe tip(s) and at least one motion sensor located and formed over the substrate. The multi-tip nano-probe apparatus in accordance with the embodiments also includes located and formed over the substrate, at least one movable probe tip that is operatively coupled with the at least one motion sensor. Within the embodiments, the at least one movable probe tip is generally retractable with respect to the at least one immovable probe tip and operatively coupled to the at least one motion sensor through at least one actuator.

While the embodiments are illustrated within the context of a multi-tip nano-probe apparatus that includes a movable tip which is electrostatically and mechanically coupled to a JFET device channel through a meander spring for motion signal transduction purposes, embodiments also contemplate other pressure sensitive components (e.g., piezo-sensitive electrical circuit components) in conjunction with at least one spring may also be used for motion signal transduction purposes. Such other pressure sensitive components may include, but are not necessarily limited to piezoresistive and piezoelectric transducers, collectively called piezo-transducers, components for motion signal transduction within the multi-tip nano-probe apparatus in accordance with the embodiments, in place of the JFET channel. These other piezo-transducer components may include, but are not necessarily limited to, piezo-crystal piezo-transducer components and piezo-resistive components. Thus, a motion sensor in accordance with the embodiments may comprise a multi-physical motion sensor that includes a photoresistor or capacitor amplified by integrated transistors, but also able to measure current through a movable probe tip.

Similarly, while the embodiments are illustrated within the context of a multi-tip nano-probe apparatus comprising two immovable probe tips with respect to a substrate and a motion sensor, and one movable probe tip with respect to the substrate and the motion sensor, embodiments are also not intended to be so limited. Rather, embodiments also contemplate a multi-tip nano-probe apparatus comprising at least one immovable probe tip with respect to a substrate and a motion sensor and at least one movable probe tip with respect to the substrate and the motion sensor.

Within the embodiments, each of the at least one immovable probe tip and the at least one movable probe tip has a length from about 30 to about 500 microns and lateral dimensions (i.e., a diameter) from about 300 to about 1000 nanometers, and is also overhanging from the substrate. In addition, each of the at least one immovable probe tip is separated from each of the at least one movable probe tip by a distance from about 100 to about 1200 nanometers.

Within the embodiments, by appropriate selection of immovable probe tips and integrated actuators, a movable probe tip may be moved in an elliptical 3D orbit relative to a substrate, or at least one immovable probe tip. As well, within the embodiments, the immovable probe tips and the movable probe tips may in accordance with further discussion below be sharpened to an atomic dimension with a radius of curvature less than about 1 nanometer.

2. Principle of Operation

Figure 2:
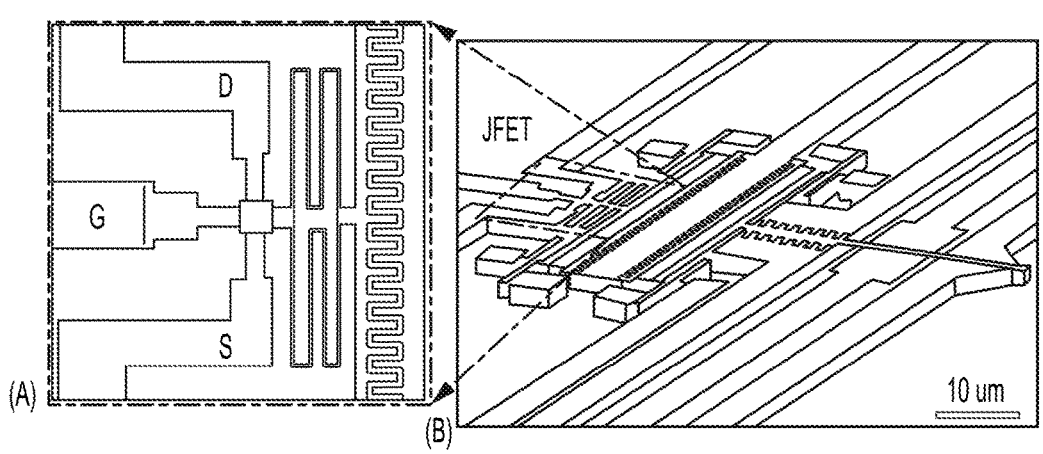
FIG. 2 shows: (A) a SEM micrograph of the JFET with meander spring; and (B) a side-view SEM micrograph of multi-tip nano-probe apparatus in accordance with the embodiments.

The operation of the multi-nano-probe system can be aided by the JFET but can also be operated without the JFET transistors. The operation of the JFET within the multi-tip nano-probe apparatus in accordance with the embodiments is otherwise generally conventional. The embodiments thus now demonstrate and illustrate the use of a JFET within a multi-tip nano-probe apparatus in accordance with the embodiments. In accordance with the embodiments, the foregoing differential tip structure is fabricated with one movable probe tip (tip 3), and two stationary immovable probe tips (tip 1 and tip 2) as seen in FIG. 1 and FIG. 2. The movable probe tip can be actuated along the y-axis using the electrostatic plate actuators F1 and F2. Applying voltages to tip 1 and tip 2 could also cause the movable tip 3 to deflect laterally. The movable probe tip can be moved in the x-direction using the electrostatic forces between F3 and tip 3. The JFET (J1) is suspended and capacitively as well as mechanically coupled to the actuator F3 through a meander spring.

Figure 3:
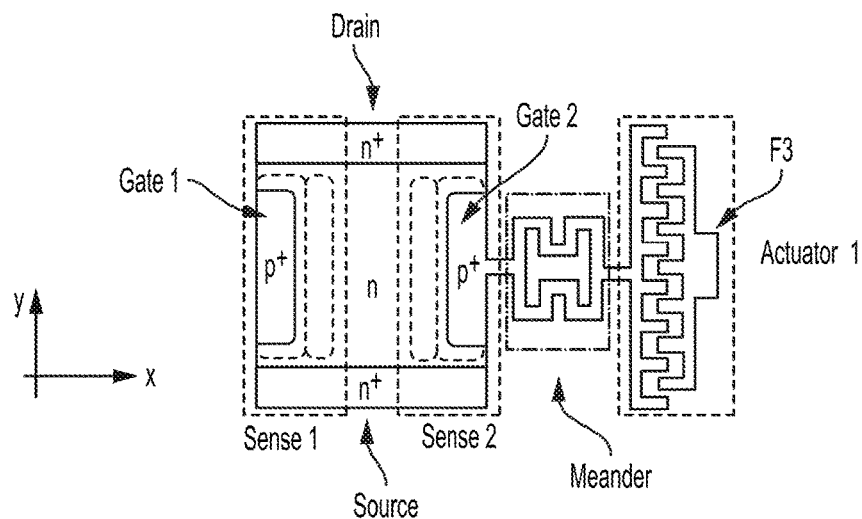
FIG. 3 shows a schematic diagram of the actuation and sensing of a piezo-strain of a JFET channel within a multi-tip nano-probe apparatus in accordance with the embodiments.

The channel of the JFET is lightly n doped ($3.11 \times 10^{-15}$ cm$^{-3}$), the gates are p+ doped ($10^{20}$ cm$^{-3}$), the source and drain are n+ doped ($10^{20}$ cm$^{-3}$). FIG. 3 is a schematic of the JFET indicating not only the JFET but also the connection to the serpentine meander spring connecting one of the gates to the electrostatic actuator F3.

a. JFET Current Contribution from the Floating Potential

The sense I part of the JFET is biased in saturation by reverse biasing gate 1. The saturation current is:

$$I_D = I_{DSS}\left(1 - \frac{V_{GS}}{V_p}\right)^2 \quad (1)$$

where $I_{DSS}$ is the saturation current when $V_{GS}=0$ and $V_p$ is the pinch-off voltage. When a negative DC voltage is applied to F3, the JFET meander extends while the probe recesses in the x-direction. Since the JFET meander-spring is electrically floating, the applied voltage on F3 induces a negative floating potential on the meander spring.

This potential reverse biases the JFET gate 2 and acts to further pinch-off the channel. This floating potential modulates the channel conductance and the new saturation current in the JFET can be written as:

$$I_{DD} = I_{DSS}\left(1 - \frac{(V_{GS} + \Delta V_{FG})}{V_p}\right)^2 \quad (2)$$

$$I_{DSS}\left(1 - \frac{V_{GS}}{V_p}\right)^2 \left[1 - \frac{\Delta V_{FG}}{V_p - V_{GS}}\right]^2$$

$$I_{DD} = I_D\left[1 - \frac{\Delta V_{FG}}{V_p - V_{GS}}\right]^2. \quad (3)$$

where $\Delta V_{FG}$ is the floating potential. If $V_P - V_{GS} > \Delta V_{FG}$, the drain current will decrease as the floating potential is increased.

b. Current Contribution from Strain

When a voltage is applied to F3, the extension of the meander-spring pulls on the gate, and induces a strain at the p+n− junction between the channel and the meander-spring. The strain in the depletion region generates a tensile stress in the channel of the JFET. The effect of the tensile stress is it enhances the channel mobility. In saturation, the drain current is:

$$I_D = I_{DSS}\left(1 - \frac{V_{GS}}{V_p}\right)^2 \quad (4)$$

$$I_{DSS} = \frac{\mu_n(qN_d)^2 tW^3}{6\varepsilon_a\varepsilon_{si}L}\left\{1 - 3\left(\frac{V_{bi}}{V_{PO}}\right)\left(1 - \frac{2}{3}\sqrt{\frac{V_{bi}}{V_{PO}}}\right)\right\} \quad (5)$$

where W is the width, t is the JFET thickness, and L is the length. If the small change in mobility is represented by $\Delta\mu$, the new current is:

$$I'_{DD} = (\mu + \Delta\mu)\frac{(qN_d)^2 tW^3}{6\varepsilon_a\varepsilon_{si}L}\cdot\left\{1 - 3\left(\frac{V_{bi}}{V_{PO}}\right)\left(1 - \frac{2}{3}\sqrt{\frac{V_{bi}}{V_{PO}}}\right)\right\}\left(1 - \frac{V_{GS}}{V_p}\right)^2 \quad (6)$$

$$I'_{DD} = I_D\left[1 + \frac{\Delta\mu}{\mu}\right] \quad (7)$$

From equation 7, the change in mobility increases the drain current in the JFET. This contrasts to the increasing floating potential effect which tries to pinch-off the channel and decrease the current. In this device, the floating potential effect is dominant.

c. Measurement of Capacitance as Sensors

The comb electrodes C1 and C2 as illustrated in FIG. 1 can measure the relative position of the moving beam which includes the movable probe tip. As the beam moves, the capacitance between the moving beam and the two fixed combs of the C1 and C2 combs will change.

d. Electro-Mechanical Actuation Simulation

Figure 4:
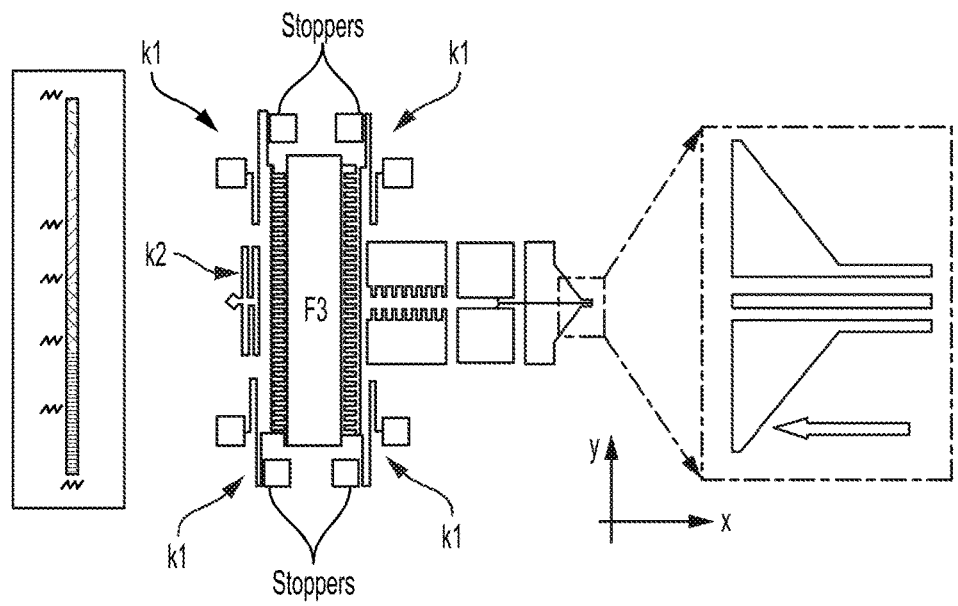
FIG. 4 shows a COMSOL simulation of displacement of a probe tip and a JFET meander spring (k2) within a multi-tip nano-probe apparatus in accordance with the embodiments. The probe tip can move in both the x and y axes.

Since the JFET responds to the movement of the movable probe tip, the change in drain current can be used to characterize this movement. FIG. 4 illustrates a COMSOL simulation of the structural and electrostatic behavior of the device.

Figure 5:
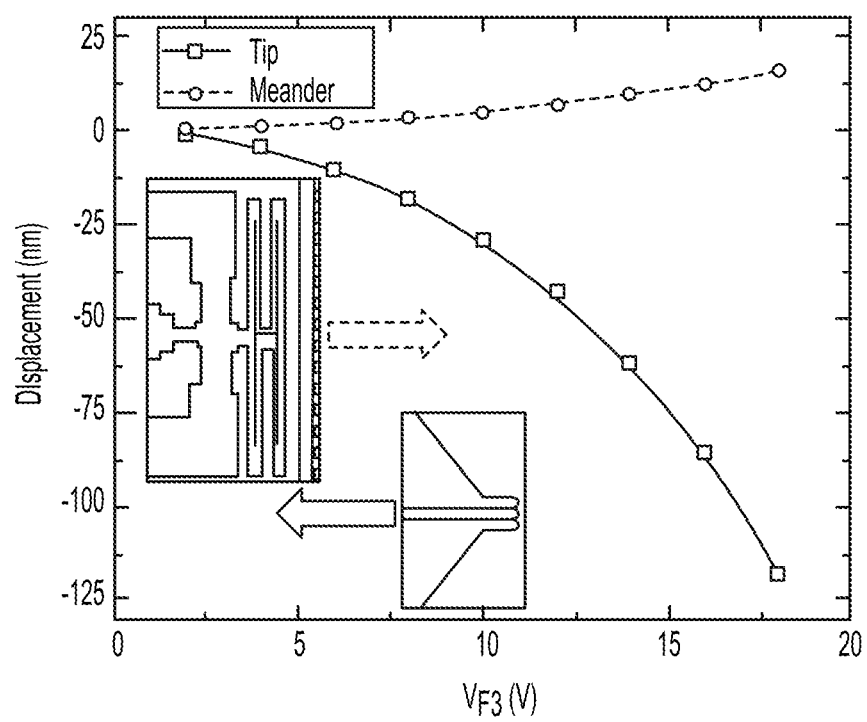
FIG. 5 shows a COMSOL simulation result for the model in FIG. 4. Actuation voltage of 18 V at F3 generates a displacement of 120 nm at the movable probe tip and 15.5 nm at the transistor meander. The meander and the movable probe tip move in opposite directions.
Figure 6:
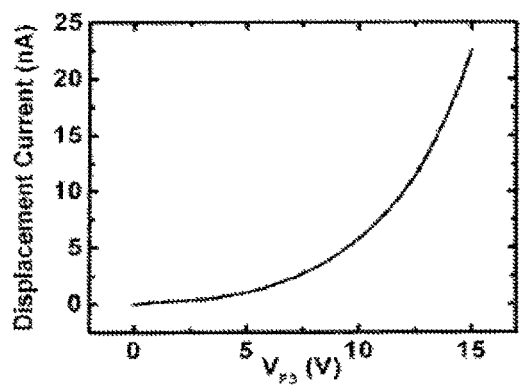
FIG. 6 shows a sweeping voltage scan applied at F3 in ramps. A displacement current due to ac motion is measured between the movable probe tip and F3.
Figure 7:
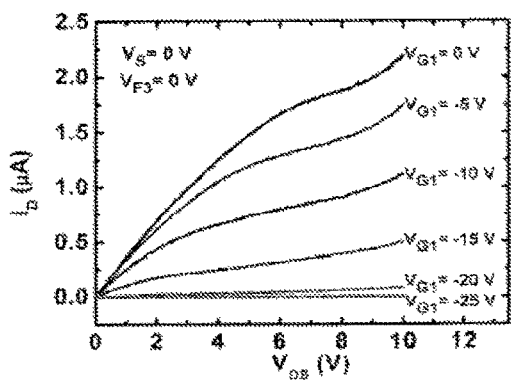
FIG. 7 shows measured $I_{DS}$ vs. $V_{DS}$ output curves for the JFET $V_{gate2}$ which was floating while $V_{gate1}$ was varied as $V_{G1}$.

The effective spring constant (2k1+k2) for a meander-spring attached to the JFET is designed to be stiffer than those connected to the movable probe tip (2k1). FIG. 5 illustrates the relationship between the x-movement of the movable probe tip and JFET meander-spring (k2) as voltage is applied to F3. Stoppers are incorporated to prevent the extreme crushing of the movable probe tip and the JFET during pull-in. The movable probe tip is 100 nm longer than the immovable probe tips. The movable probe tip and the JFET meander-spring move in opposite directions with an applied voltage on electrode actuator F3. The movable probe tip has a range of motion from a default position to 500 nanometers which provides that the movable probe tip may be retractable or extendable with respect to the immovable probe tip.

3. Device Fabrication

The fabrication of the multi-tip nano-probe apparatus in accordance with the embodiments parallels the methodology described in Amponsah et al., "Monolithically integrated junction FETS and NEMS," Micro Electro Mechanical Systems (MEMS), 2011 IEEE 24th International Conference Proceedings, pp. 91-94, 23-27 Jan. 2011, which is incorporated herein fully by reference to the extent allowed. The devices and related apparatus were fabricated using 2 μm thick n-type SOI wafers with resistivity of 2 ohm-cm. The source and drain were doped using PH-1025 solid source diffusion targets while the gates were doped with BN-1250 solid source diffusion targets. The doped wafer was furnace annealed to drive-in the dopants. $MoSi_2$ was used for the metallization and the devices were etched by DRIE. Release of the devices and related apparatus were undertaken in vaporous hydrofluoric acid (HF). Mask sets were designed and selected to provide the particular apparatus that is illustrated in FIG. 3(b).

Figure 24A:
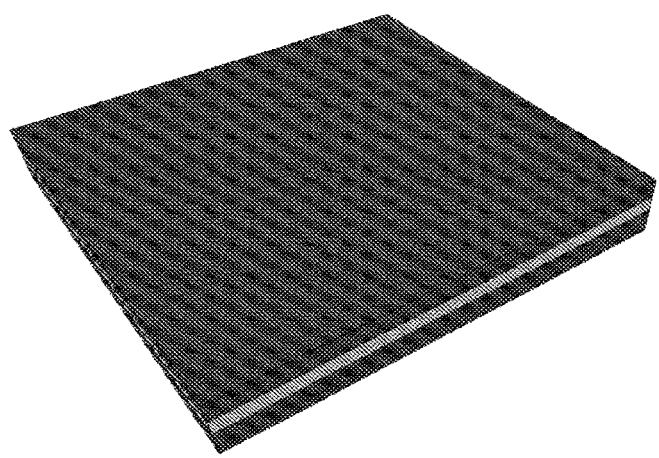
FIG. 24A to FIG. 24T show a series of schematic perspective view diagrams illustrating the results of progressive process stages in fabricating a motion sensor integrated nano-probe N/MEMS apparatus in accordance with the embodiments.
Figure 24B:
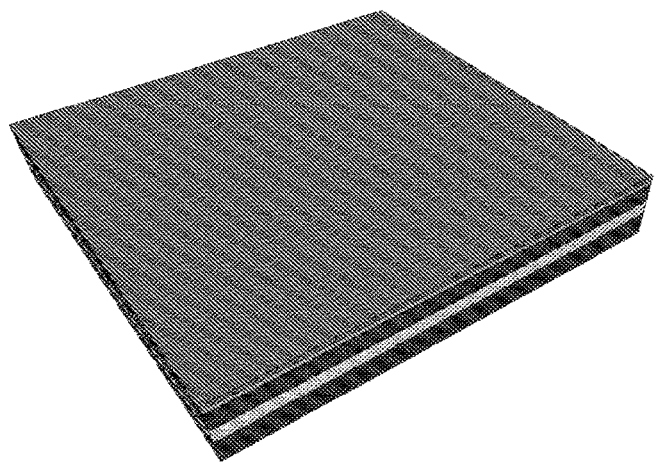
FIG. 24B shows that a layer of $SiO_2$ and chromium (Cr) were sequentially deposited upon the SOI structure of FIG. 24A. The chromium served as an etch mask for the $SiO_2$ etch.
Figure 24C:
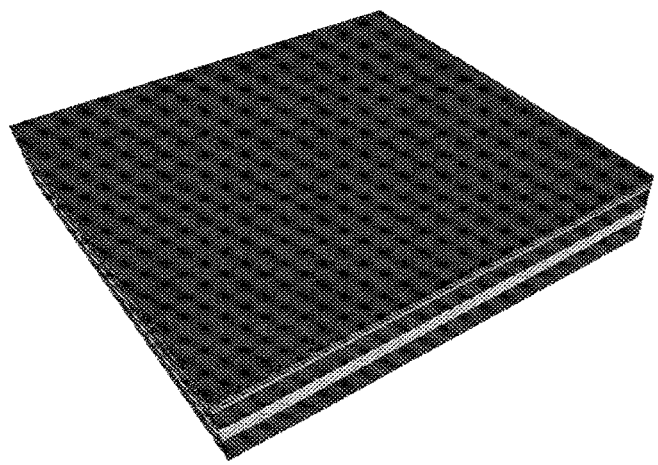
FIG. 24C shows that a photoresist layer was spun and the source and drain terminals of the JFET were patterned using deep ultraviolet (DUV) lithography.
Figure 24D:
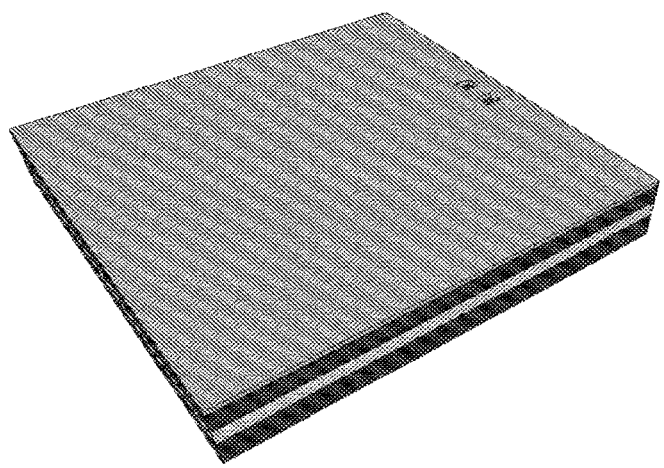
FIG. 24D shows the source and drain terminal pattern is reactive ion etched (RIE) into the Cr and $SiO_2$ masks.
Figure 24E:
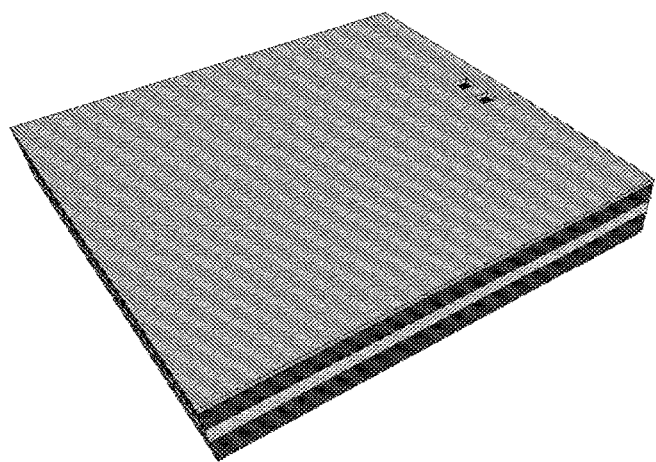
Figure 24F:
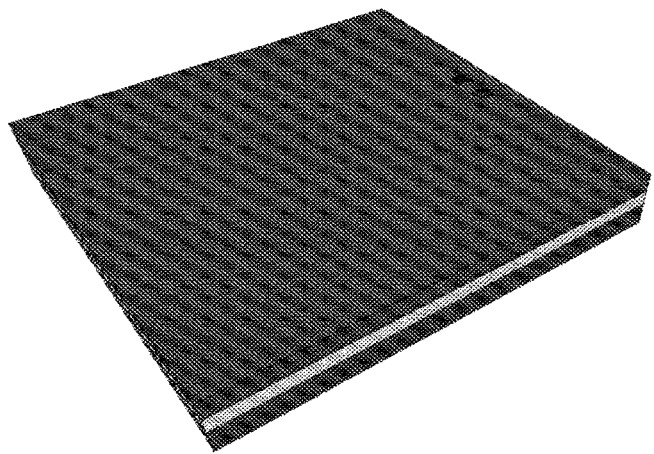
FIG. 24F shows the $SiO_2$ diffusion mask was removed using hydrofluoric acid (HF).
Figure 24G:
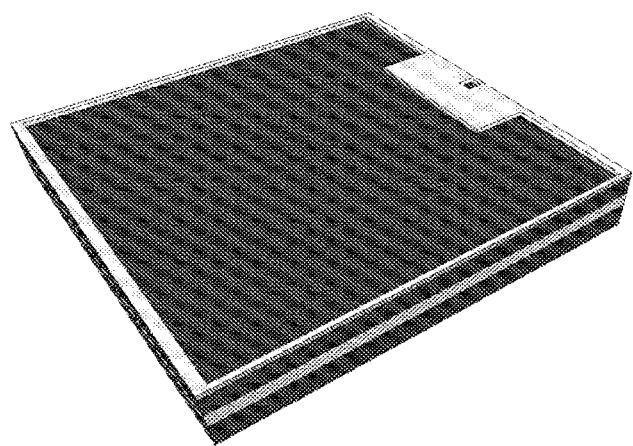
FIG. 24G shows that steps 24B through 24D were repeated but this time, the source, drain and channel regions were protected with $SiO_2$.
Figure 24H:
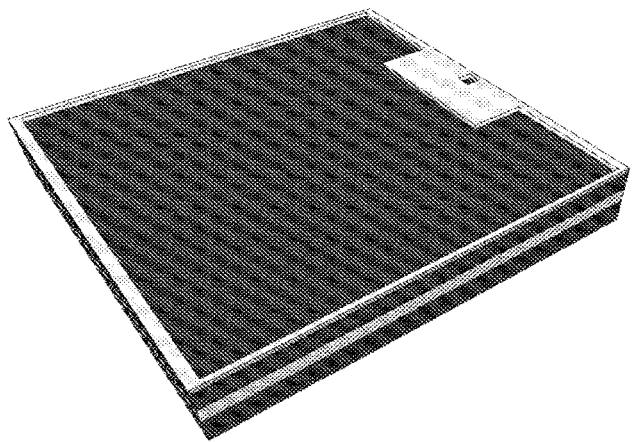
FIG. 24H shows BN-1250 solid source target was used to diffuse boron dopants into the JFET gate region as well as the comb-drives, actuation electrodes and tip area.
Figure 24I:
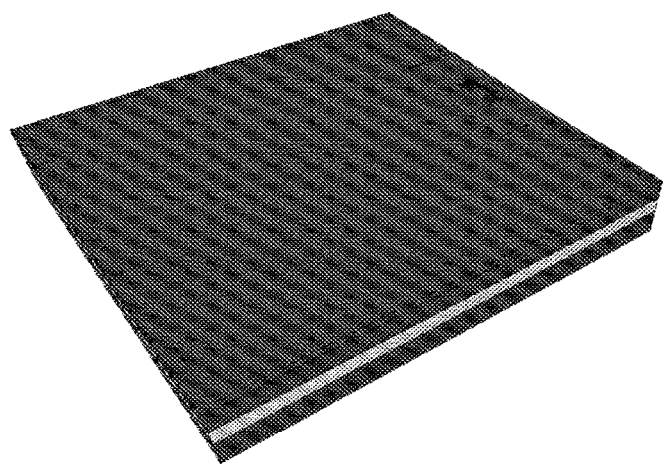
FIG. 24I shows the $SiO_2$ diffusion mask was removed using hydrofluoric acid (HF).
Figure 24J:
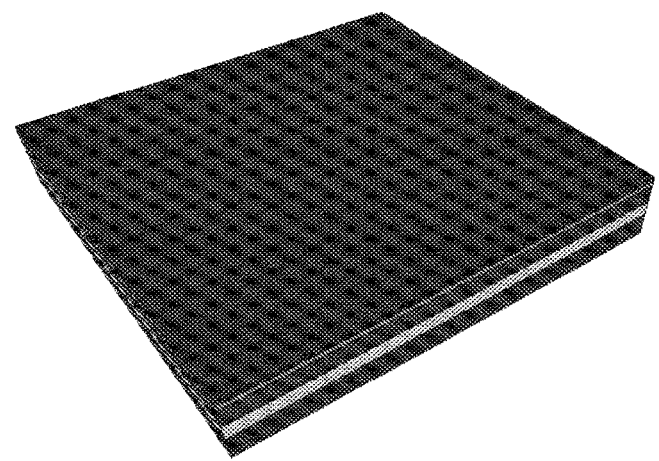
FIG. 24J shows a blanket $MoSi_2$ layer was sputter deposited and a photoresist layer was spun on top of the blanket $MoSi_2$ layer.
Figure 24K:
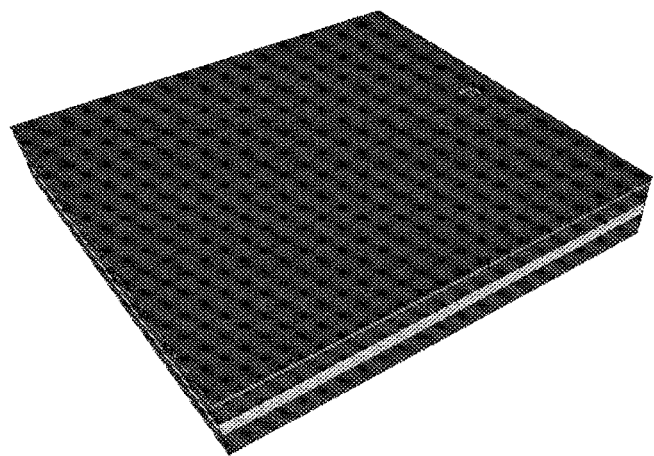
FIG. 24K shows the channel region was patterned and RIE etched into the $MoSi_2$. At this point the JFET channel is solely N-type silicon.
Figure 24L:
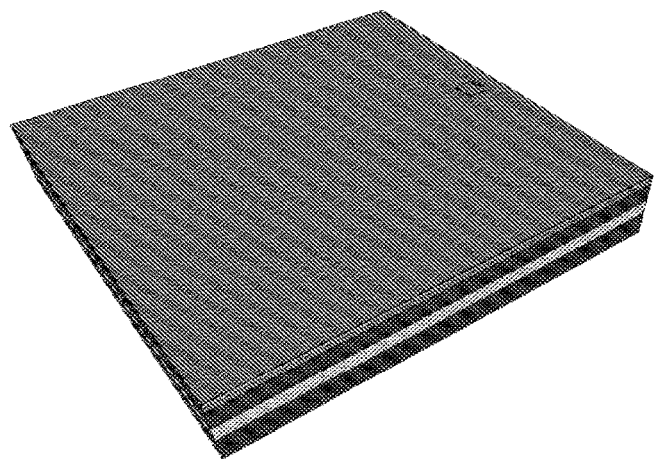
FIG. 24L shows the resist is stripped with oxygen plasma. $SiO_2$ and Cr masks were deposited.
Figure 24M:
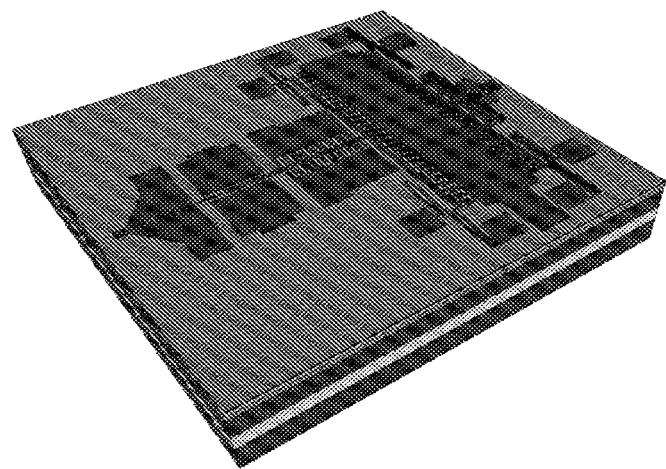
FIG. 24M shows negative tone resist was spun and the nano-probe apparatus was patterned using DUV lithography.
Figure 24N:
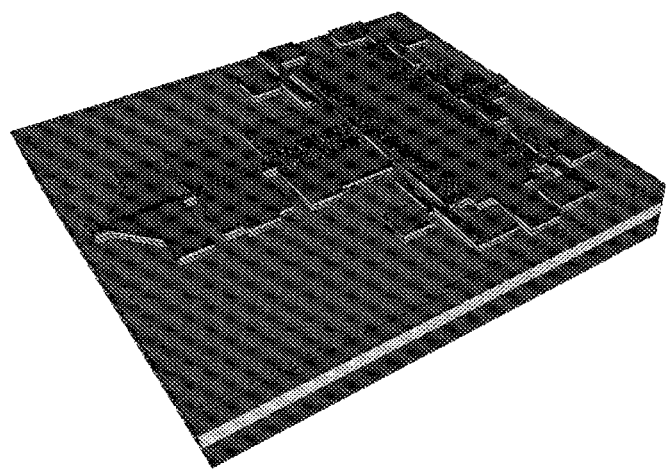
FIG. 24N shows the Cr, $SiO_2$ and $MoSi_2$ stack was RIE etched down to the silicon device layer.
Figure 24O:
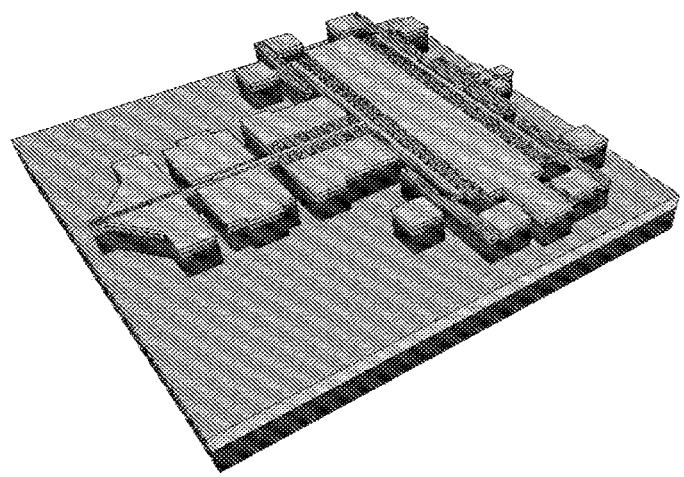
FIG. 24O shows before etching the silicon device layer, the resist and Cr layers were removed with 1165 solvent and Cr etchant respectively. The $SiO_2$ mask was used for deep reactive ion etching (DRIE) the silicon device layer.
Figure 24P:
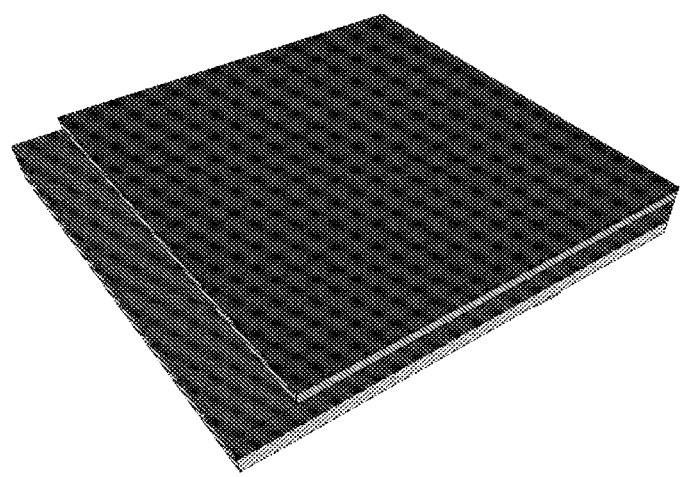
FIG. 24P shows to expose the tips, the wafer was flipped over and $SiO_2$ deposited as well as resist spun. The backside $SiO_2$ was patterned and RIE etched.
Figure 24Q:
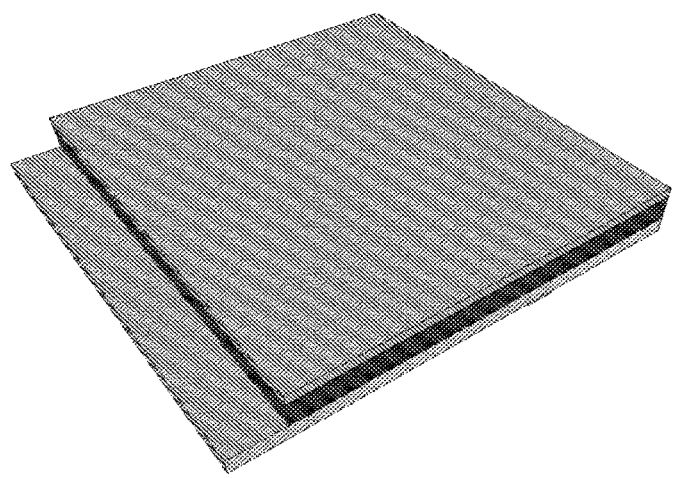
FIG. 24Q shows the backside $SiO_2$ served as an etch mask for etching the handle wafer all the way down to the buried oxide.
Figure 24R:
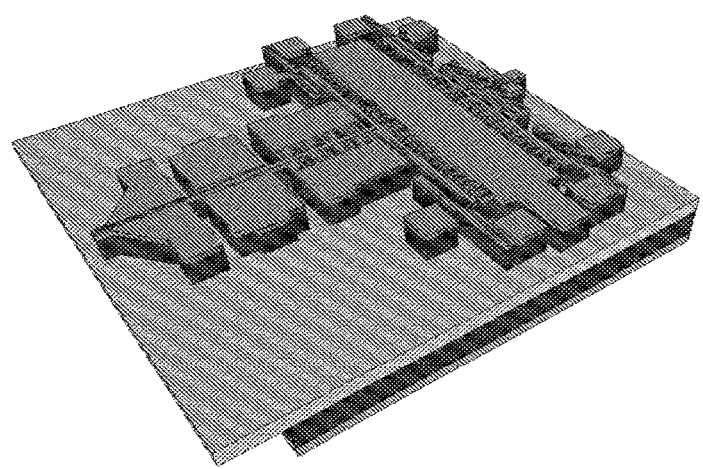
FIG. 24R shows the $SiO_2$ etch mask on the device layer was RIE etched before performing annealing of the $MoSi_2$.
Figure 24S:
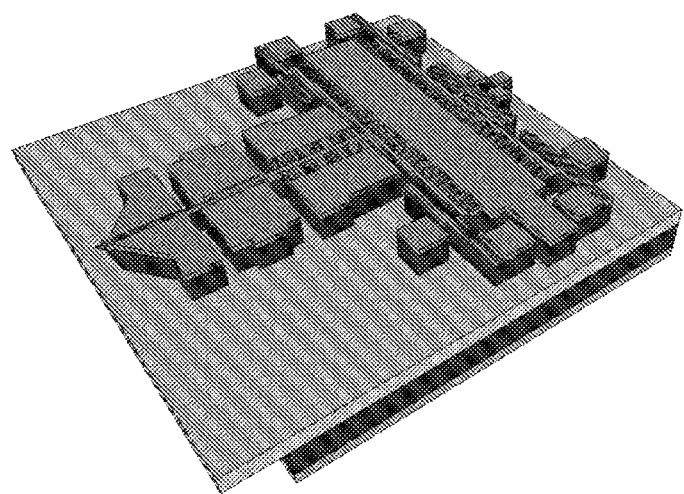
FIG. 24S shows focused ion beam was used to sharpen the tips.
Figure 24T:
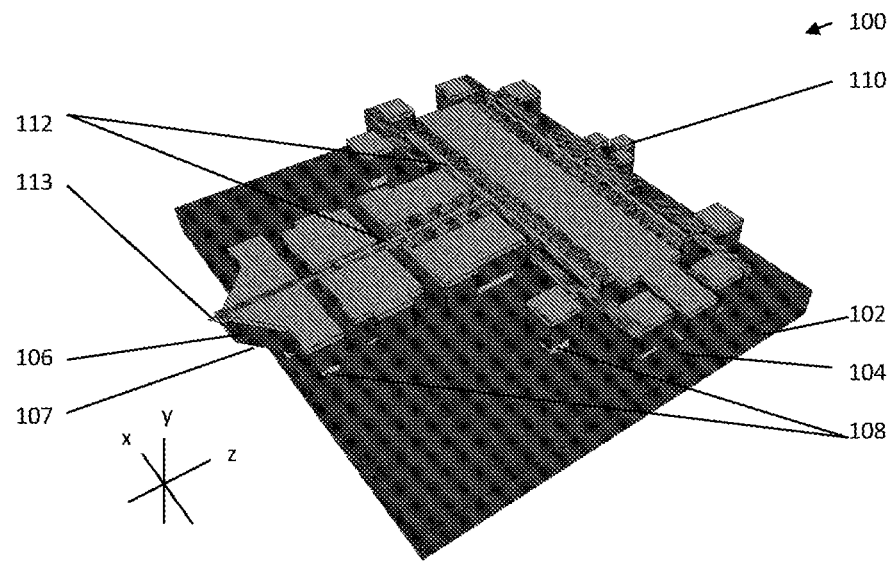

A particular set of schematic perspective view diagrams illustrating a process sequence for fabricating a multi-tip nano-probe apparatus in accordance with the embodiments is illustrated within FIG. 24A to FIG. 24T. Specific descriptions of the individual drawing figures are found above in the Brief Description of the Drawings.

Figure 23:
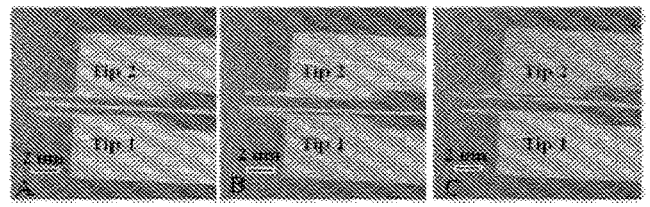
FIG. 23 shows with respect to within a multi-tip nano-probe apparatus in accordance with the embodiments: (A) all tips are grounded; (B) +3.5 V is applied to tip 1; (C) +3.5 V is applied to tip 2.

With more particularity, FIG. 24T schematically illustrates an embodied, fabricated nano-probe N/MEMS apparatus 100. The apparatus 100 includes an operationally stationary substrate 102 having a flat, top support surface 104. Apparatus 100 further includes a nano-probe device structure 106 having a bottom surface 107, wherein the device structure 106 is disposed adjacently over an area of the flat, top support surface 104 of the substrate 102, as illustrated. A pedestal structure 108 is disposed immediately adjacent the flat, top support surface 104 of the substrate 102 and the bottom surface 107 of the nano-probe device structure 106, which fixedly connects the nano-probe device structure 106 to the substrate 102. A motion sensor 110 is coupled to the nano-probe device structure 106 and fixedly connected to the flat, top support surface 104 via a portion of the pedestal structure (not shown) below the motion sensor. The apparatus 100 further includes a nano-probe 112 in the shape of a "T" including a distal tip 113 that is operatively and non-directly coupled to the nano-probe device structure 106 and the motion sensor 110. The nano-probe 112 is freely moveable (by virtue of the absence of any interconnecting structures and to the extent that during movement it encounters a different, unconnected structure) with respect to both the fixedly disposed nano-probe device structure 106 and the stationary substrate 102 at least in a plane (x-z plane) that is parallel to the flat, top support surface 104 of the substrate and a plane (x-z plane) that is parallel to the bottom surface 107 of the nano-probe device structure. The apparatus 100 may have two immovable probe tips disposed operationally adjacent the nano-probe tip 113 as shown in FIG. 23.

TABLE 1

Device parameters

| Parameter | Symbol | Value |
| --- | --- | --- |
| Spring Constant for Tip 3 meanders | 2k1 | 5.54 N/m |
| Spring Constant for JFET meanders | 2k1 + k2 | 22.66 N/m |
| Pinch-off voltage | $V_f$ | −25 V |

TABLE 1-continued

Device parameters

| Parameter | Symbol | Value |
| --- | --- | --- |
| Transconductance at $V_{DS}$ = 10 V and $I_{DSS}$ | $\theta_m$ | 0.2 μS |
| Transconductance parameter | β | 4.1 nA/V$^2$ |
| JFET channel width | W | 2 μm |
| JFET and probe Thickness | t | 2 μm |

Figure 8:
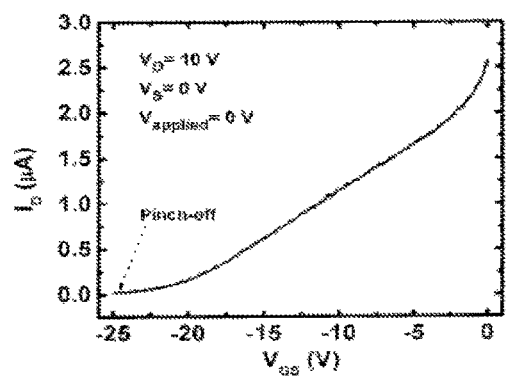
FIG. 8 shows transfer curves for a JFET in accordance with the embodiments biased at $V_{DS}$=10V. The $I_{on}/I_{off}$ ratio is 126.

The pinch-off voltage, which is given by equation 8, was measured to be −25 V at $V_{DS}$=10 V as illustrated in FIG. 8

$$V_p = V_{bi} - V_{po} \qquad (8)$$

$$V_{po} = \frac{qW^2 N_d}{2\varepsilon_a \varepsilon_{si}} \qquad (9)$$

From equation 8 and equation 9 it can be seen that the pinch off voltage is directly proportional to the JFET device doping concentration. Decreasing the pinch-off voltage of the JFET device by lightly doping the channel will decrease both the drive current and transconductance of the JFET device. A tradeoff between pinch-off voltage and current characteristics illustrates the design issues for optimizing operation with electrostatic actuation with high operating voltages.

c. Sensing the Motion of the Moving Probe Tip Through the JFET

Figure 9:
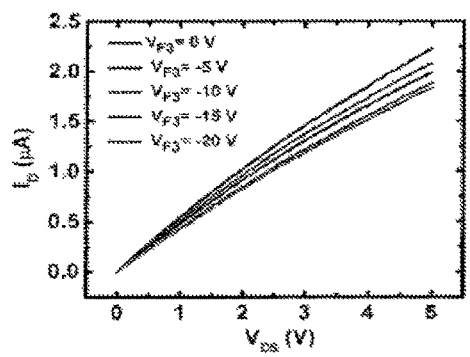
FIG. 9 shows both a probe tip and a JFET transistor motion as an actuation voltage is applied and the JFET is able to sense the motion of the movable probe tip. The induced floating potential and strain on the JFET modulates the drain current. For these experiments $V_{gate1}$ was set at 0 volts.

To sense the motion of the movable probe tip, different negative voltages were applied to F3 and the drain current modulation monitored as shown in the output curves in FIG. 9.

The applied voltage induced strain and mirrored a floating potential onto the JFET, and the floating potential modulated the channel conductance to a higher degree. For $V_{F3}$=−20 V, the change in current was 0.4 μA from $V_{F3}$=0 V, indicating an effective potential of −2.3 V at gate 2 of the JFET device.

d. Probe Tip Tunneling/Contact Current Measurement

Areas where a multi-tip nano-probe apparatus in accordance with the embodiments may find applications include, but are not limited to, scanning probe microscopy, biological nano probing, applying nano-scale strain to thin films and performing nano-scale conductance measurements of materials. To measure the contact current, the Si probe tips were brought into contact with a tungsten sample. The contact current measured was low (100 fA at sample to tip voltage of 20 V) while typical STM currents are in nA ranges.

Figure 10:
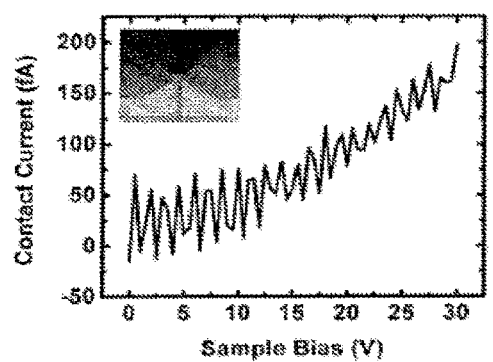
FIG. 10 shows that the measured contact current between the movable probe tip and a tungsten sample is low, which might be due to the formation of oxide at the movable probe tip or high series resistance of the movable probe tip.

The low observed current could have been due to oxide formation at the Si tip of the nano-probe apparatus or the tungsten sample. Also, due to the nanoscale size of the nano-probe, a series resistance could have an effect on the measured current. To this effect, and as discussed below, $MoSi_2$ metal layers have been incorporated on top of the multi-tip nano-probe beams to decrease the series resistance. FIG. 10 illustrates the measured contact current without the $MoSi_2$.

e. Probe Tip Materials and Dimensions

As indicated above, to reduce the series resistance of the multi-tip nano-probes, one may consider silicidated $MoSi_2$ metal on top of the probe tips. The $MoSi_2$ is annealed (in Ar/$H_2$ at 750 C for 3 minutes) to form a strong electrical and physical contact with the probe tip interface. Without such an annealing process step, the $MoSi_2$ will peel off from the probe tip surface during BOE or vapor HF release due to a stress gradient. Instead of using Si for surface scanning, MoSi$_2$ will be the metal for surface scanning.

Conventional metal STM tips are normally made of tungsten or Pt/Ir. In order to form atomic sharp tips from tungsten wire, an electrochemical process is used to etch the tungsten wire metal. During the chemical etching, a constriction develops at the metal-solution interface and the metal part that is submerged in the etchant dissolves away from the wire and the wire develops an atomic tip. In the case of PtIr wire, pliers can be used to apply strain to cut the Pt/Ir wire.

Figure 11:
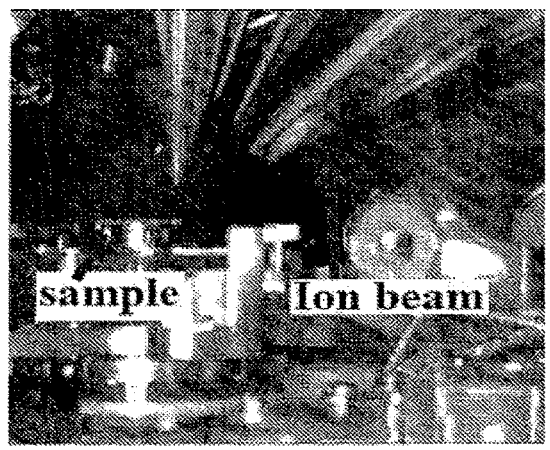
FIG. 11 shows the position of a probe tip sample with respect to an ion gun is 52 degrees when cutting the sample with a fixed ion beam from the ion gun.

These techniques are not ideal for the nano-probes. One may consider a new approach to form metal STM tips with sub 50 nm tip diameter without electrochemical etching or strain application. Focused Ion Beam (FIB) with gallium source is used to cut the tip of the probe at an angle of 52 degrees. FIG. 11 shows the mounting orientation of the JFET device and apparatus with respect to the ion beam.

Figure 12:
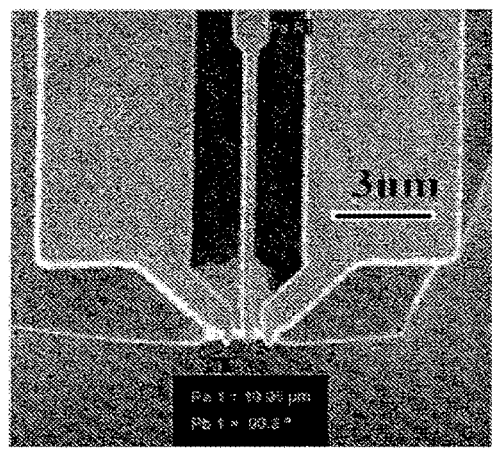
FIG. 12 shows a probe tip before an FIB cut. The top layer is $MoSi_2$.
Figure 13:
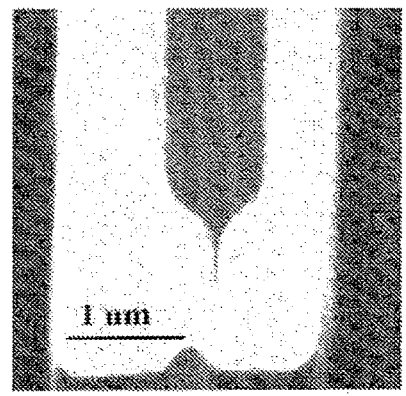
FIG. 13 shows an FIB cut of a probe tip with $MoSi_2$ exposed to ion beam.
Figure 14:
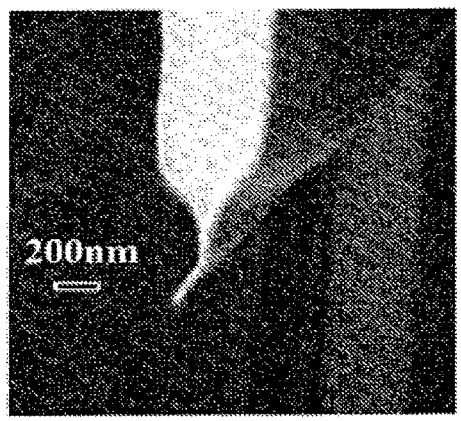
FIG. 14 shows a side view of a movable probe tip after a FIB cut with $MoSi_2$ exposed to an ion beam. $MoSi_2$ forms the tunneling tip in this device.

During the ion milling, the ion gun sharpens the tip of the probe. FIG. 12 is the before FIB cut and FIG. 13 and FIG. 14 are the SEM images of the probe after FIB cut. It should be stated that this sharpening of the probe tip occurs only if the MoSi$_2$ material layer is exposed to the ion beam.

Figure 15:
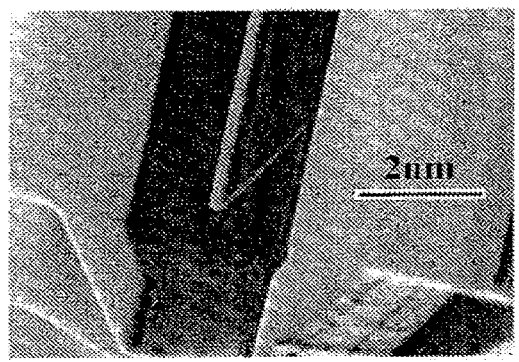
FIG. 15 shows side view of a movable probe tip after an FIB cut. $MoSi_2$ protected by 300 nm of $SiO_2$.

One may verify the foregoing observation by fabricating Fibbing devices which included a MoSi$_2$ layer protected by 300 nm of SiO$_2$. The tip was cut at 52 degrees. FIG. 15 shows the SEM side view of the 52 degree cut. It can be seen that the probe tip is still protected by the SiO$_2$ and it has a larger tip radius. The FIB beam voltage that was used was 30 KeV at 0.28 nA of beam current. Although 52 degree angle was achieved for the demonstrated devices, it is understood that other angles, particularly in a range from about 30 to about 60 degrees, are also possible by choosing the angle between the gallium ion beam and the probe beam.

5. Application Examples a. Resonance Frequency Measurement

Figure 16:
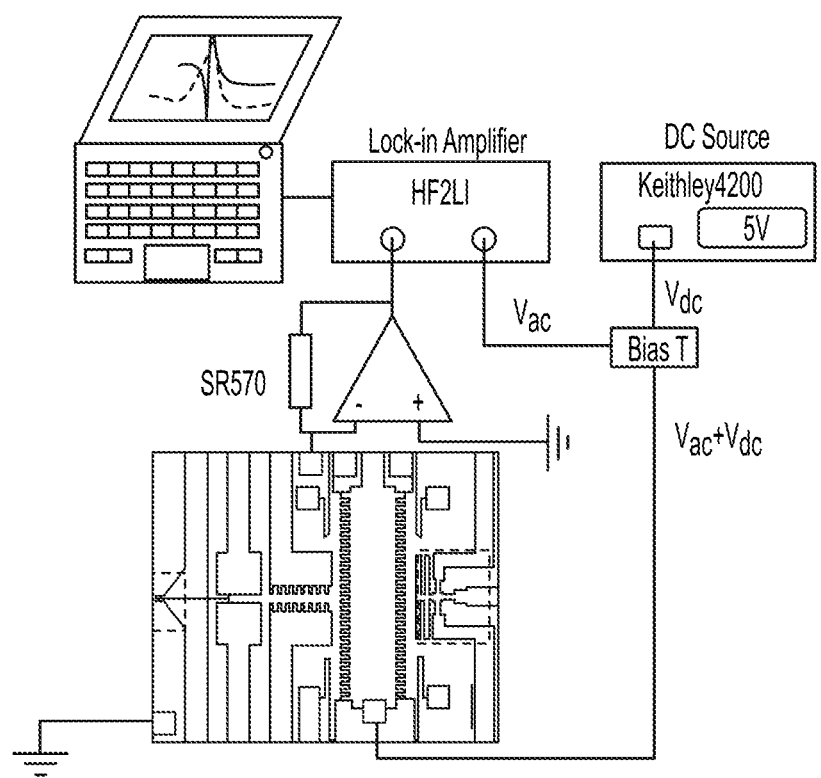
FIG. 16 shows an electrical apparatus for resonance frequency measurement of a movable probe tip within a multi-tip nano-probe apparatus in accordance with the embodiments.

The multi-tip nano-probe apparatus that includes the JFET device in accordance with the embodiments may be employed in both AFM and STM applications. In these applications, the movable probe tip may be excited in resonance and scanned along a sample surface. Using an apparatus in accordance with the apparatus as illustrated in FIG. 16, the resonance frequency of a movable probe tip was measured in vacuum at 1.9 e-3 mbar.

Figure 17:
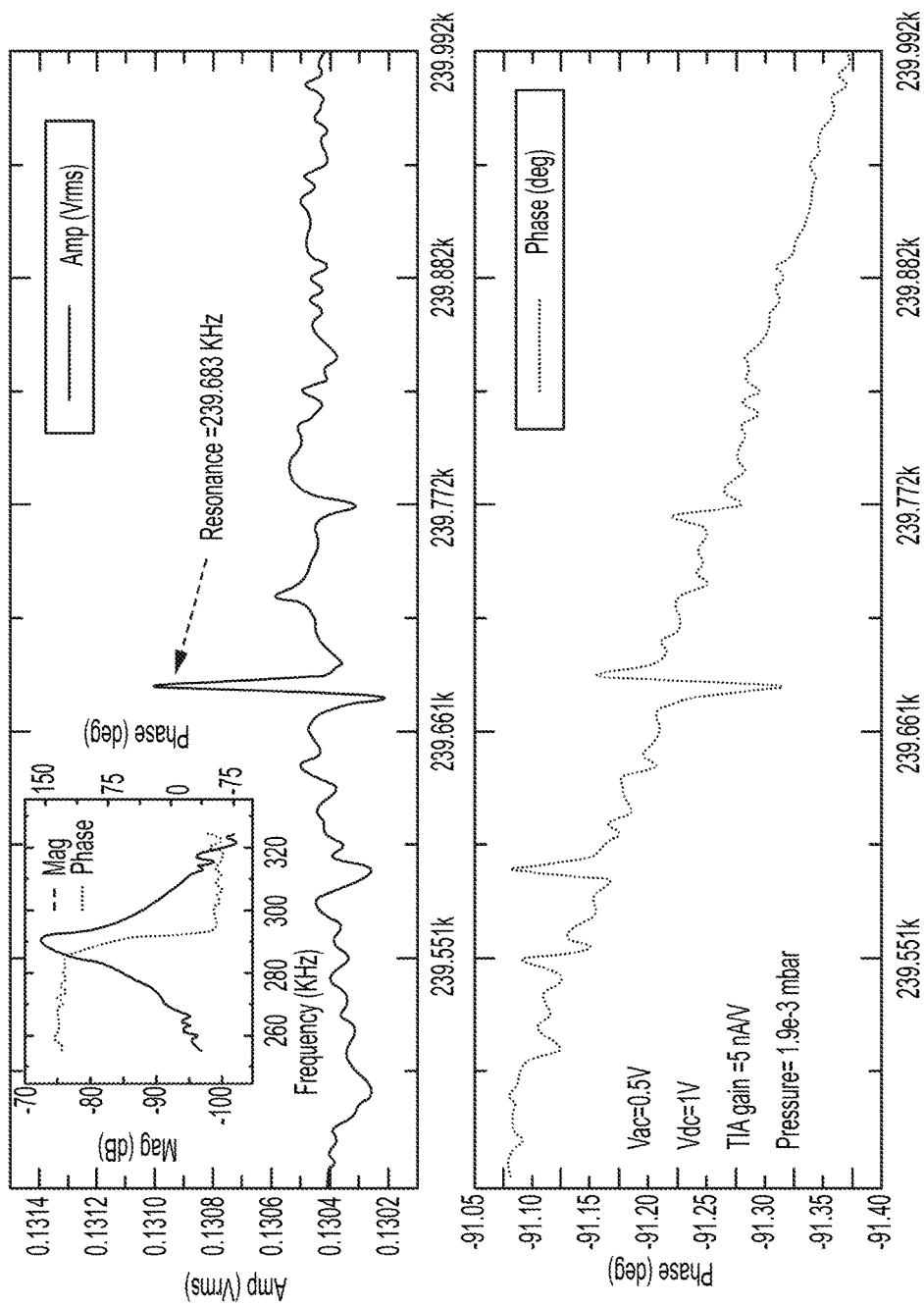
FIG. 17 shows a resonance frequency measurement of the movable probe tip in vacuum at a pressure of 1.9 e-3 mbar.

The SOI substrate was grounded, and using a lock-In amplifier from Zurich Instruments (HF2LI), an AC sweep was combined with DC voltage through a bias-tee and launched on electrode F3. A displacement current through the movable probe tip was fed into an SR570 low noise transimpedance amplifier (TIA) with sensitivity set to 5 nA/V. The output of the TIA was fed into the lock-in amplifier for frequency domain analysis. FIG. 17 shows the measured fundamental resonance frequency of the movable probe tip.

The resonance frequency of the movable probe tip was measured to be 239.7 KHz as illustrated in FIG. 17. The inset in FIG. 17 is the optical measurement of the resonance frequency which was 291.5 KHz. The spring constant of the movable probe tip was 5.54 N/m indicating sufficient stiffness needed for precision placement and contact force without buckling the movable probe tip. The Brownian noise displacement was evaluated using equation 10:

$$\bar{x} = \sqrt{\frac{4k_B Tb}{k^2} \left\{ \frac{1}{\left[1-\left(\frac{\omega}{\omega_o}\right)^2\right]^2 + \frac{\omega^2}{(Q\omega_o)^2}} \right\}} \text{ m}/\sqrt{\text{Hz}} \quad (10)$$

where $k_B$ is the Boltzmann constant ($1.38066 \times 10^{-23}$ J/K), T is temperature (300 K), b is the damping coefficient ($0.37 \times 10^{-6}$ N s/m), k is the spring constant (5.54 N/m), $\omega_0$ is the measured resonance frequency ($1.5 \times 10^6$ rad/s) and Q is the quality factor (~10). At resonance, the Brownian noise force is expected to be $78 \times 10^{-15}$ N/sqrt (Hz) and the mean noise displacement is $0.14 \times 10^{-12}$ N/sqrt (Hz). The Brownian noise displacement on the tip is two orders of magnitude lower than the inter-atomic distance of most 2D thin films providing sufficient SNR for lateral measurement.

b. Scanning Tunneling Microscopy of Highly Ordered Pyrolytic Graphite (HOPG)

Figure 18:
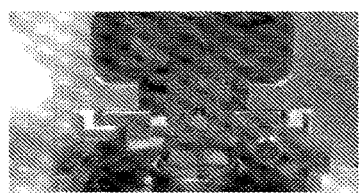
FIG. 18 shows an assembled NEMS-prober in accordance with the embodiments on a PCB board that is finally mounted in a JEOL SPM system. A HOPG sample sits below the N/MEMS-prober.
Figure 19:
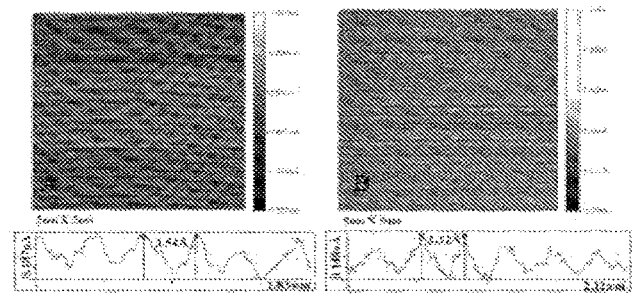
FIG. 19 shows: (A) the use of a commercial Pt-Ir tip to scan a HOPG sample; and (B) the use of a N/MEMS-prober in accordance with the embodiments to scan the HOPG sample.

To investigate the atomic arrangement of HOPG, multi-tip nano-probe apparatus devices were fabricated without the two stationary tips. The movable probe tip was sharpened with FIB and wire-bonded to a PCB board as shown in FIG. 18. The board together with the NEMS-prober was inserted into a JEOL 4210 SPM system. With the movable probe tip grounded and 350 mV applied to the HOPG sample, the sample was brought into close proximity with the movable probe tip until 500 pA of current was sensed then a 5 nm by 5 nm scan of the sample was initiated in ambient air. FIG. 19A and FIG. 19B show the scan results obtained with a commercial Pt/Ir tip and the N/MEMS-prober in accordance with the embodiments, respectively.

c. Conductance Measurement

Figure 20:
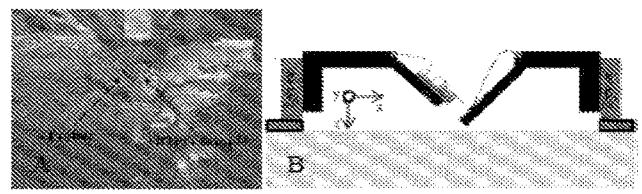
FIG. 20 shows: (A) a N/MEMS prober and a HOPG sample mounted in an SEM for in-situ conductance analysis of the HOPG sample; and (B) a schematic of the testing assembly in the SEM using Zyvex nanopositioners.

The N/MEMS-prober in accordance with the embodiments and HOPG sample were mounted on a Zyvex® SEM manipulator as shown in FIG. 20. The navigation of the prober towards the sample was viewed in real time in the SEM to avoid overdrive of the prober into the sample which had the tendency to break the tips. Once in soft contact, a voltage ramp was applied to the movable probe tip and current flow was recorded from the side tips, providing differential conductance measurement.

Figure 21:
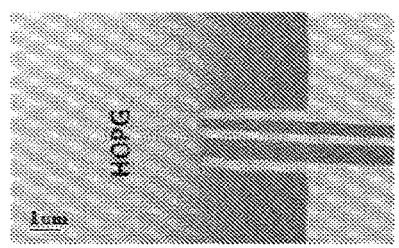
FIG. 21 shows a SEM micrograph of the probe tips of a N/MEMS prober in accordance with the embodiments in soft contact with a HOPG sample.
Figure 22:
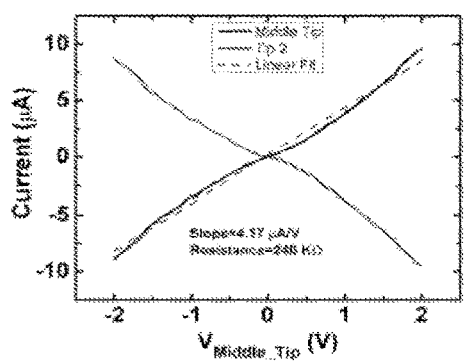
FIG. 22 shows the conductance characteristics of a HOPG sample as measured using a multi-tip nano-probe apparatus in accordance with the embodiments. The dashed line is a linear fit to the movable probe tip current and the resistance of a HOPG sample is determined from the inverse slope of this line.

FIG. 21 and FIG. 22 show the soft contact and current-voltage characteristics of the sample respectively. The extracted resistance between the movable probe tip and the right immovable probe tip was 0.4 Ω/nm$^2$. It was also observed that during hard contact, the two outermost immovable probe tips were capable of bending about 30 degree without breaking while the movable probe tip retracted.

d. Tip Spacing Modulation

The gap spacing between the movable probe tip and either of the immovable side probe tips can be reduced by applying voltage ramps to either electrode F1 or F2. Also applying voltages to tip 1 and tip 2 laterally deflects the movable probe tip. FIG. 23 shows the in-situ SEM image of the movable probe tip with voltages applied to the side immovable side probe tips with the middle movable probe tip grounded. By modulating the spacing, transport phenomena such as transitions from localized, diffusive and ballistic transport can be investigated 6. Summary of Modes of Operation of Multi-Tip Nano-Probe Apparatus The following lists operational characteristics for various applications of a multi-tip nano-probe apparatus in accordance with the embodiments.

I. STM Mode
   a. Apply a voltage difference between the middle tip and thin film.
   b. Sense the tunneling current.
   c. Scan the thin film to investigate atomic arrangement and other properties.
II. AFM Mode
   a. Excite the middle tip in resonance by applying combined AC and DC voltages to electrode F3.
   b. The changes in the vibrational amplitude of the tip is tracked.
   c. The z-signal of the PZT scanner is used to map the atomic arrangement of the thin film.
III. Transconductance Mode A
   a. The middle tip is retracted.
   b. The outermost tips are either brought in close proximity or full contact with thin film.
   c. Current-Voltage measurements are carried out between the outermost tips.
IV. Transconductance Mode B
   a. The middle tip is retracted.
   b. The outermost tips are aligned and brought in proximity or full contact with thin film.
   c. The middle tip is now brought in proximity or full contact with thin film.
   d. Current-Voltage measurements conducted between middle tip and the outermost tips. (Current is driven through the outermost electrodes to generate a voltage across the thin film. The inner electrode is used to measure the voltage with high input impedance. In this method, the contact resistance of the electrodes does not affect the thin film resistivity.)
V. Tunnel Gap Modulation
   a. The middle tip is retracted.
   b. The outermost tips are used for aligning prober to thin film.
   c. The middle tip serves as a gate and the outermost tips as source and drain.
   d. By applying voltage ramps to F3, the tunnel gap (gap between middle tip and sample) can be changed.
   e. Voltages applied to the middle tip can modulate the channel conductance between the source and the drain terminals.
VI. Applying Strain
   a. The middle tip could be used to apply strain to thin films.
   b. Current-Voltage measurements can be carried out simultaneously between the middle tip and the outermost tips.
VII. Tip Spacing Modulation
   a. Applying voltage ramps to F1 and F2 will change the spacing between the middle tip and the outermost tips.
   b. Also applying voltage ramps to the outermost tips could cause the middle tip to deflect laterally changing the tip spacing.
VIII. Localized Scanning
   a. The middle tip is brought in close proximity to the sample.
   b. Applying voltage ramps to F1 and F2, the middle tip could be used to locally scan the region between the outermost tips.
7. Conclusion Active JFETs, electrostatic sensors and actuators have been integrated into a three-probe tip scanning probe tip apparatus and device, with two immovable probe tips, and a third movable probe tip. As the movable probe tip moves, the floating potential that the JFET acquires further reverse biases the JFET. The change in the depletion width modulates the channel conductance of the movable probe tip motion. Also, the stretching out of the meander-spring induces a strain in the channel of the JFET which is coupled to the meander spring. The strain and floating potential effects act in opposition but the floating potential is the dominant mechanism in this apparatus and related device.

All references, including publications, patent applications, and patents cited herein are hereby incorporated by reference in their entireties to the extent allowed, and as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein may be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present embodiments without departing from the spirit and scope of the invention. There is no intention to limit the embodiments or invention to the specific form or forms disclosed, but on the contrary, the intention is to cover all modifications, alternative constructions, and equivalents falling within the spirit and scope of the invention, as defined in the appended claims. Thus, it is intended that the present embodiments and invention cover the modifications and variations of this invention provided they come within the scope of the appended claims and their equivalents.

What is claimed is:

1. A nano-probe N/MEMS apparatus, comprising:
   an operationally stationary substrate having a flat, top support surface;
   a nano-probe device structure having a bottom surface, disposed adjacently over an area of the flat, top support surface of the substrate;
   a pedestal structure disposed immediately adjacent said flat, top support surface of the substrate and said bottom surface of the nano-probe device structure that fixedly connects the nano-probe device structure to the substrate;

a motion sensor coupled to the nano-probe device structure and fixedly connected to said flat, top support surface via a portion of the pedestal structure;

a nano-probe having a distal tip operatively not attached to the nano-probe device structure and the motion sensor, wherein the nano-probe is freely moveable with respect to both the fixedly disposed nano-probe device structure and the stationary substrate at least in a plane parallel to the flat, top support surface of the substrate and a plane parallel to the bottom surface of the nano-probe device structure; and an immovable probe tip disposed operationally adjacent the nano-probe tip and configured to be laterally moveable with respect to the at least one immovable probe tip in a plane parallel to the flat, top support surface of the substrate.

2. The nano-probe apparatus of claim 1 wherein the nano-probe tip has an angle from 30 to 60 degrees.

3. The nano-probe apparatus of claim 1, wherein the motion sensor comprises a junction field-effect device and a spring.

4. The nano-probe apparatus of claim 3, wherein the motion sensor includes a junction field-effect device channel region.

5. The nano-probe apparatus of claim 1, wherein the motion sensor is coupled to the nano-probe through at least one actuator.

6. The nano-probe apparatus of claim 1, wherein the nano-probe tip is electrically isolated from the at least one immovable probe tip.

7. The nano-probe apparatus of claim 6, wherein the nano-probe tip is axially retractable and extendable with respect to the at least one immovable probe tip.

8. The nano-probe apparatus of claim 1, wherein the nano-probe tip has a length from about 30 to about 500 microns, a lateral dimension from about 300 to about 1000 nanometers.

9. The nano-probe apparatus of claim 1, wherein the nano-probe tip is moveable in an elliptical 3D orbit.

10. The nano-probe apparatus of claim 1, wherein the nano-probe tip and the at least one immovable probe tip are separated by an air gap.

11. The nano-probe apparatus of claim 10, wherein the nano-probe tip and the at least one immovable probe tip are separated by a distance from about 100 nanometer to about 1200 nanometers.

12. The nano-probe apparatus of claim 1, wherein the nano-probe device structure has two immovable probe tips disposed operationally adjacent the nano-probe tip.

13. The nano-probe apparatus of claim 3, wherein the junction field-effect device is a JFET that is monolithically integrated into the nano-probe N/MEMS apparatus.

14. The nano-probe apparatus of claim 13, wherein the nano-probe is coupled to a JFET electrode through an electrostatic energy-sustaining gap.

15. The nano-probe apparatus of claim 13, wherein the motion sensor comprises a piezo-transducer.

16. The nano-probe apparatus of claim 1, wherein the nano-probe device structure further comprises a meander spring coupled to the nano-probe.

17. The nano-probe apparatus of claim 3, wherein the spring is a meander spring.

18. The nano-probe apparatus of claim 1, wherein the nano-probe tip is retractable, extendable, and bendable with respect to the at least one immovable probe tip.

19. A probing method, comprising:
positioning, with respect to a sample, nano-probe N/MEMS apparatus, comprising an operationally stationary substrate having a flat, top support surface; a nano-probe device structure having a bottom surface, disposed adjacently over an area of the flat, top support surface of the substrate; a pedestal structure disposed immediately adjacent said flat, top support surface of the substrate and said bottom surface of the nano-probe device structure that fixedly connects the nano-probe device structure to the substrate; a motion sensor coupled to the nano-probe device structure and fixedly connected to said flat, top support surface via a portion of the pedestal structure; and a nano-probe having a distal tip operatively not attached to the nano-probe device structure and the motion sensor, wherein the nano-probe is freely moveable with respect to both the fixedly disposed nano-probe device structure and the stationary substrate at least in a plane parallel to the flat, top support surface of the substrate and a plane parallel to the bottom surface of the nano-probe device structure; and moving the nano-probe with respect to the sample while measuring a signal output from the motion sensor;

wherein the nano-probe device structure is characterized by having at least one immovable probe tip disposed operationally adjacent the nano-probe tip and configured to be laterally moveable with respect to the at least one immovable probe tip in a plane parallel to the flat, top support surface of the substrate.

20. The probing method of claim 19, wherein the motion sensor comprises a JFET, the nano-probe is coupled to a JFET electrode through an electrostatic energy-sustaining gap, and the freely moveable nano-probe is sensed by a change in a JFET channel carrier mobility via an electrostatic force-induced strain in the JFET channel.

21. The probing method of claim 19, wherein the motion sensor comprises a JFET, the nano-probe is coupled to a JFET electrode through an electrostatic energy-sustaining gap, and the freely moveable nano-probe is sensed by a floating potential on a JFET gate generated by a coupled charge across the nano-probe, which modulates a JFET channel current in the form of a measureable signal.

* * * * *